May 5, 1925. 1,536,803

C. L. LEHMAN ET AL

SAFETY WHEEL LOCK FOR MOTOR DRIVEN VEHICLES

Filed Feb. 12, 1924 2 Sheets-Sheet 1

Inventors:
C. L. LEHMAN
H. C. VAKINER

May 5, 1925.                                           1,536,803
C. L. LEHMAN ET AL
SAFETY WHEEL LOCK FOR MOTOR DRIVEN VEHICLES
Filed Feb. 12, 1924                    2 Sheets-Sheet 2
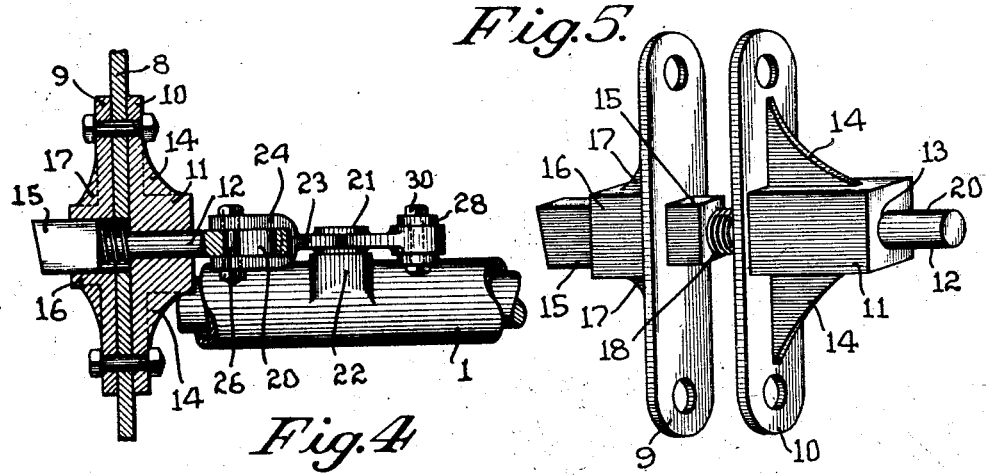
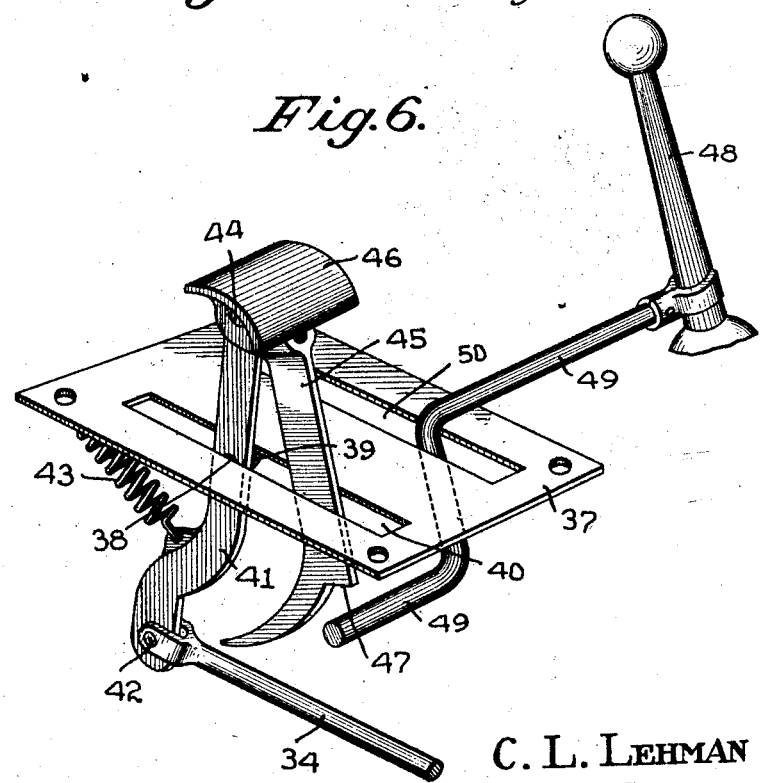
Inventors
C. L. LEHMAN
H. C. VAKINER
By
Attorney Patented May 5, 1925.

1,536,803

UNITED STATES PATENT OFFICE.

CHARLES LEWIS LEHMAN AND HENRY CONRAD VAKINER, OF EDMONTON, ALBERTA, CANADA.

SAFETY WHEEL LOCK FOR MOTOR-DRIVEN VEHICLES.

Application filed February 12, 1924. Serial No. 692,324.

*To all whom it may concern:*

Be it known that we, CHARLES LEWIS LEHMAN and HENRY CONRAD VAKINER, subjects of the King of England, residing at Edmonton, in the Province of Alberta and Dominion of Canada, have invented new and useful Improvements in Safety Wheel Locks for Motor-Driven Vehicles, of which the following is a specification.

At times, drivers or chauffeurs either lose control of the motor-driven vehicle or the vehicle stalls on steep grades and very often if the brakes are not applied at the right time, the vehicle travels rearwardly, hence endangering the lives of the chauffeur and the passengers.

In view of the above, the present invention has for its purpose to provide, in a safety wheel lock for motor-driven vehicles, automatic means for preventing retrograde movement of the vehicle, therefore obviating the possibility of the chauffeur losing control of the vehicle and thereby preventing endangering the lives of the passengers.

Another purpose is to provide a lock of the present character which will permit steep grades to be climbed in perfect safety, the construction and arrangement of the lock being such that, when in cooperation with a member carried within the brake drums, it will allow the vehicle to travel forwardly but will automatically retard retrogression of the vehicle in case the vehicle stalls.

Still another purpose is to provide a mechanism of this character which, when the vehicle stalls on ascending or climbing a steep grade, will hold the vehicle independently of the brakes or engine, allowing the engine to be started when the transmission is in neutral, and when the controlling means of the transmission is moved to first position, will allow the vehicle to move forward as the brakes are off.

A further purpose is to provide, in a safety lock for motor-driven vehicles, ratchet rings mounted on the interior of the brake band housings, in conjunction with means under suitable tension and carried by the inner disks of the housings, said means cooperatively engaging with said ratchet rings and adapted to be in constant readiness to prevent retrogression of the vehicle in case it stalls on a steep grade or incline.

A still further purpose is the provision of means which not only positively locks said detent means but may also be used for disengaging said detent means from the ratchet rings and thereby permit free revoluble movements of the rear wheels.

It is to be understood that the particulars herein given are in no way limitative and that, while still keeping within the scope of the invention, any desired modifications of details and desired proportions may be made in the apparatus according to the circumstances.

The invention comprises further features and combinations of parts to be hereinafter set forth, shown in the drawings and claimed.

In the drawings:

Figure 4 is an enlarged sectional view on line 4—4 of Figure 2, showing the spring tensioned detent.

Figure 5 is an enlarged perspective view of the opposed parts of the detent housing.

Figure 6 is a detail perspective view of the foot lever including the lock for holding the same set.

Figure 1:
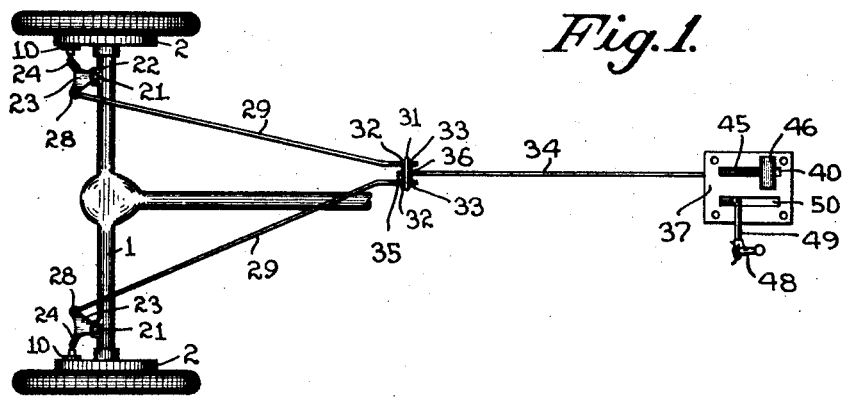
Figure 1 is a plan view of a portion of an automobile, showing the rear wheels, the axle housing and the improved safety wheel lock applied in accordance with the invention.
Figures 2, 3:
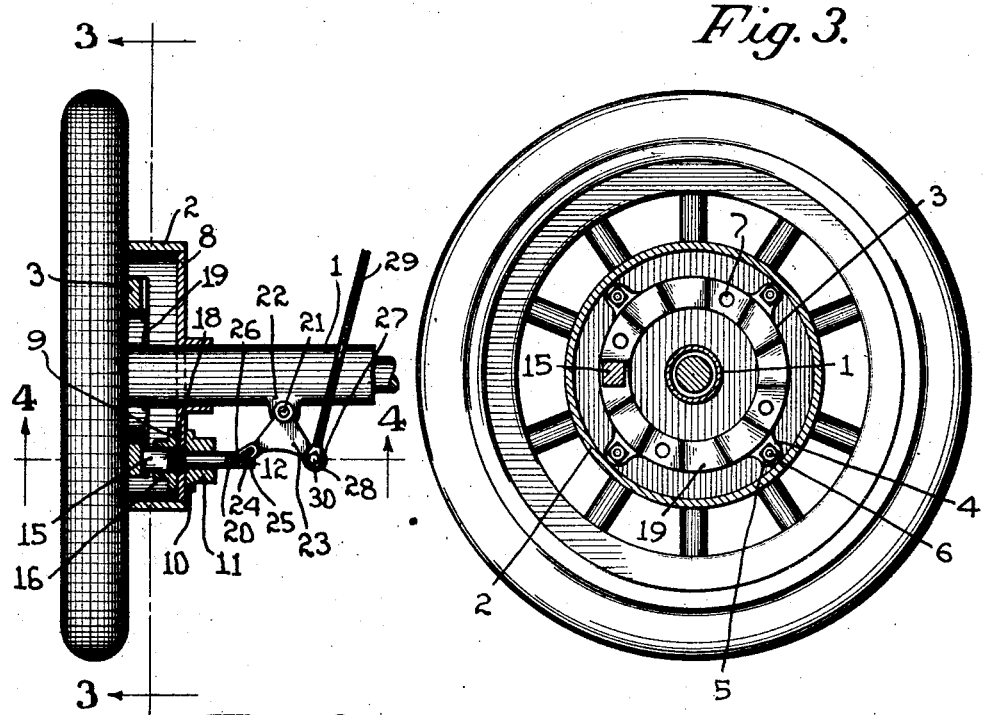
Figure 2 is an enlarged sectional view through a portion of the brake drum, showing the ratchet and the detent means in an operative position therewith.
Figure 3 is a sectional view on line 3—3 of Figure 2.

Referring to the drawings, 1 designates the rear axle housing and 2 the brake drums, and arranged on the interior thereof are ratchet rings 3. The rings 3 are provided with projections 4 which radiate and have apertures or openings 5 which are internally threaded for the reception of stud bolts 6 which are threaded into the inner walls of the brake drums. However, the ratchet rings have additional openings 7 which are internally threaded to receive stud bolts which may pass through the inner walls of the brake drums.

It is obvious that either set of openings 5 or 7 may be used for fastening the ratchet rings to the inner walls of the brake drums. In the present case, both sets of openings are used in order to illustrate that either set may be employed. This is accomplished for the reason that in some cases the stud bolts which may pass through the openings 5 would be in the way of some obstruction or the stud bolts which pass through the openings 7 may be in the path of some obstruction and to avoid this contingency either set of openings may be used.

The brake drums include the inner disk walls 8 which are carried by the axle housing 1 and secured to the disk walls 8 are plates 9 and 10, the former being on the interior of the disk walls 8, the latter on the exterior. The latter plates have housings 11 for the reception of the bolts 12 which are guided through openings 13 in the ends of the housings 11. The housings 11 are reinforced relative to the plates 10 by means of the webs or walls 14. The bolts 12 have enlarged outer ends 15 which may be any suitable length and preferably rectangular or square in cross section, although they may be otherwise shaped. These ends are guided through the relatively short housings 16 which are integral with the plates 9 and are reinforced by the webs 17.

Expansion coil springs 18 are mounted in the housings 11 and in surrounding relation to the bolts 12. In fact, the springs 18 are reinforced between the enlarged ends 15 and the end walls of the housings 11, the springs acting to hold the outer extremities of the enlarged ends 15 constantly in engagement with the toothed faces 19 of the ratchet rings, thereby preventing rear revoluble movement of the rear wheels of the vehicle and hence preventing retrograde movement of the machine.

The inner adjacent ends of the bolts 12 are provided with slots 20 and fulcrumed at 21 on projections 22 of the axle housing 1 are bell crank levers or V-shaped sectors 23, certain arms 24 of which have slots 25 through which and through the slots 20 suitable coupling bolts 26 extend, thereby connecting the bell crank levers or sectors to the bolts. Due to the slot connections of the bolts with the bell crank levers or sectors, it is obvious that the bolts ride over the toothed faces of the ratchet rings as long as the vehicle is traveling forwardly. It is obvious that in case the vehicle is ascending a steep grade and should the vehicle stall or the chauffeur lose control of the machine, the bolts upon retrograde movement of the wheels will engage with the teeth of the ratchet rings and thereby prevent excessive retrograde movement of the vehicle.

Other arms 27 of the bell crank levers or sectors are pivotally connected to the forked ends 28 of rods 29 by means of suitable bolts 30. The rods 29 converge forwardly and their threaded ends pass through a coupling plate 31, there being nuts 32 and 33 upon opposite sides of the coupling plate for the purpose of adjusting the rods in their relative positions to result in proper operations of the bell crank levers or sectors. The coupling plate 31 is connected to an additional rod 34 by means of nuts 35 and 36 threaded upon the rod 34 adjacent opposite sides of the plate 31, so that the rod 34 may be adjusted to accommodate itself in a position between the plate and an actuator.

Secured to the floor of the automobile adjacent the foot board thereof is a plate 37 which covers an opening in the floor of the vehicle, and pivotally mounted at 38 on depending lugs 39 of the plate and movable in a slot 40 is a lever 41, the lower arm of which is pivoted at 42 to the forward end of the rod 34. A relatively heavy coil spring 43 of greater tension than the combined springs 18 is connected to the lower arm of the lever 41 and in turn to the under side of the plate 37. This spring acts to hold the rod 34 in its forward position and the extremities of the enlarged ends 15 of the bolts normally out of engagement with the toothed face of the ratchet rings. However, when ascending a steep grade or incline, the chauffeur may apply pressure on the lever and relieve the excessive tension of the spring 43, allowing the springs 18 to hold the bolts in engagement with the ratchets so that, in case of the vehicle stalling, the bolts will automatically engage with the shoulders of the ratchet and prevent retrograde movement of the vehicle.

Pivotally mounted on the upper ends of the lever 41, as at 44, is a lock 45 provided with a foot piece 46. This lock conforms to the shape of the lever 41 and depends through the slot 40 and has a shoulder 47. It is obvious that the operator may apply pressure on the foot piece and at the same time on the lock 45, so that pressure may be applied on the lever 41 without causing the lock 45 to rock on its pivot 44. However, in order to hold the lever 41 pressed forwardly and thereby actuating the rod 43 to hold the bolts in firm engagement with the toothed face of the ratchet rings, the operator may exert pressure forwardly and downwardly in such manner as to tilt the lock 45, at the same time pushing the lever 41 forwardly, thereby causing the shoulder 47 to engage one end of the slot 40 and thereby retain the lever in its forward tilted position. When the lever is so positioned, the bolts will remain in firm engagement with the toothed faces of the ratchet rings and thereby prevent retrograde movement of the vehicle.

Without some means to prevent it, the chauffeur, without thinking, may operate the transmission lever into reverse position without first having released the lock 45 which will cause serious injury to various operating parts of the automobile. To avoid this difficulty, the lever 41 is positioned substantially close to the transmission lever, and carried by the latter 48 is an arm 49 passing downwardly through an additional slot 50 of the plate 37. This arm is angular and is positioned so that, when the transmission lever is moved to second position, it may escape engagement with the lower end of the lock 45, but should the transmission lever be moved to reverse position, the arm will engage with the rear of the lower end of the lock 45 and thereby disengage the shoulder 47 from the plate 37, allowing the spring 43 to so act on the lever 41 as to disengage the bolts from the toothed faces of the ratchet rings and thereby permit the automobile to travel rearwardly.

The invention having been set forth, what is claimed is:

1. In a safety lock for motor-driven vehicles, the combination with the brake drums of an automobile including ratchet rings therein, of tensioned members carried by stationary parts of the brake drums and adapted for engagement with the ratchet rings to prevent retrograde movement of the vehicle, an element operatively connected with said members and including means of greater tension than the tension of the members to retain the members out of engagement with said ratchet rings, a lock movably mounted upon the element including a shoulder for engagement with a stationary member, thereby retaining said tensioned members in engagement with the toothed faces of the ratchet rings, and a device carried by the transmission lever and cooperating with the lock when the lever is moved to reverse position, thereby releasing the lock and allowing the tensioned element to overcome the tensioning means of the first members, hence releasing the rear wheels to permit rearward movement of the vehicle.

2. In a safety lock for motor-driven vehicles, the combination with a brake drum and axle housing flange, of a co-operating ratchet ring and spring actuated bolt carried respectively by the drum and flange, a foot-actuated lever operatively connected with the bolt, a lock for said lever to retain it in position to dispose the bolt in operative relation with the ratchet ring, and a transmission lever-carried element disposed to release the lock upon movement of said transmission lever into reverse position.

In testimony whereof they affix their signatures.

CHARLES LEWIS LEHMAN.
HENRY CONRAD VAKINER.